United States Patent [19]

Oka et al.

[11] 3,931,606

[45] Jan. 6, 1976

[54] DEVICE FOR SIMULTANEOUSLY CONTROLLING A PLURALITY OF VARIABLE RESISTORS

[75] Inventors: Shunzo Oka, Osaka; Matsuo Nishioka, Nishinomiya, both of Japan

[73] Assignee: Matsushita Electric Industrial Co., Ltd., Osaka, Japan

[22] Filed: Nov. 21, 1973

[21] Appl. No.: 418,026

Related U.S. Application Data

[63] Continuation of Ser. No. 321,831, Jan. 8, 1973, abandoned.

[52] U.S. Cl. ............. 338/128; 74/471 XY; 338/132
[51] Int. Cl.² ......................................... H01C 10/16
[58] Field of Search ........... 338/128, 129, 130, 131, 338/132, 133, 134; 323/80; 74/471 XY

[56] References Cited
UNITED STATES PATENTS
3,321,990  5/1967  Densmore .................... 74/471 XY

*Primary Examiner*—Bruce A. Reynolds
*Attorney, Agent, or Firm*—Burgess Ryan and Wayne

[57] ABSTRACT

A first pair of variable resistors are mounted on two opposite walls of a substantially rectangular outer casing in such manner that their rotary shafts coaxially extend through the walls and are attached to two opposite walls of a substantially rectangular inner casing. A second pair of variable resistors are mounted on two opposite walls of the inner casing in such manner that the rotary shafts are coaxial and that the axis of the shafts of the second pair of resistors is perpendicular to the axis of the shafts of the first pair of resistors. A connecting member links the shafts of the second pair of variable resistors. An operating shaft is rotatably mounted on and extends through the connecting member at right angles to the shafts of the first and second variable resistors and has a plurality of ganged additional variable resistors mounted on it, so that rotation of the operating shaft controls the additional variable resistors, while tilting of the operating shaft selectively controls the first and second pairs of resistors.

1 Claim, 5 Drawing Figures

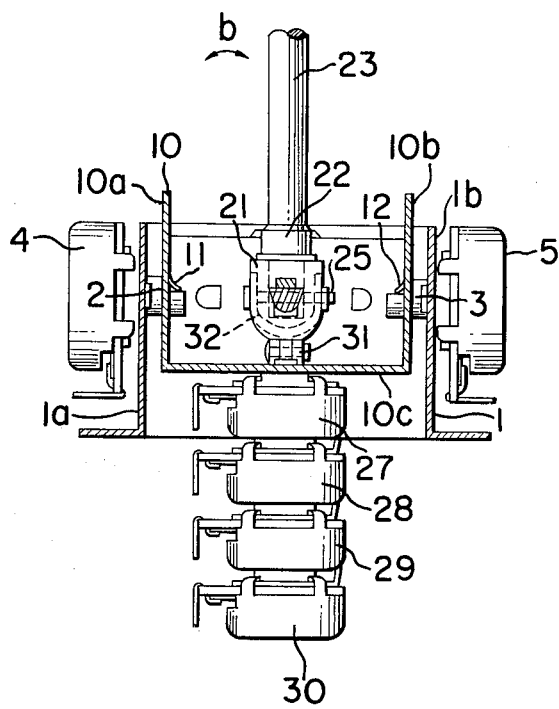
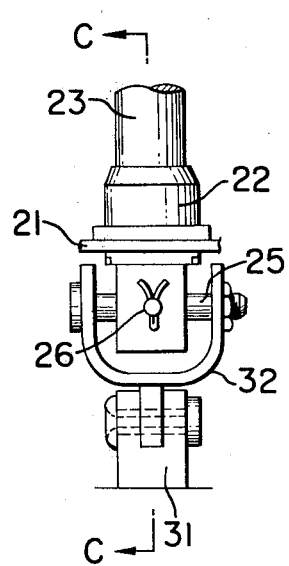
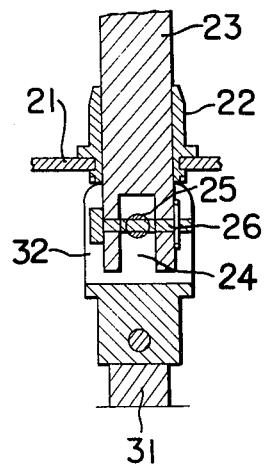

DEVICE FOR SIMULTANEOUSLY CONTROLLING A PLURALITY OF VARIABLE RESISTORS

This is a continuation of application Ser. No. 321,831, filed Jan. 8, 1973, abandoned.

BACKGROUND OF THE INVENTION

The present invention relates to a device for simultaneously controlling a plurality of variable resistors with a single operating shaft.

For example, in a stereophonic recording and reproducing system, where it is required to control the volumes for the individual four channels singly or simultaneously and also to control the balance among the four volumes, operation of the volume control as well as the balance control will be considerably facilitated if they could be accomplished by a single control device. However, there has not been proposed yet such a control device which is simple in construction.

SUMMARY OF THE INVENTION

One of the objects of the present invention is therefore to provide a device for simultaneously controlling more than four variable resistors with a single operating or control shaft.

Another object of the present invention is to provide a variable resistor control device of the type described which is simple in construction and inexpensive to manufacture.

Briefly stated, according to the present invention, a first pair of variable resistors are coaxially mounted upon the opposing outer walls of an outer casing or frame substantially rectangular in cross section in such a manner that their rotary shafts extend inwardly into the outer casing. An inner casing or frame also rectangular in cross section is mounted on the rotary shafts of the variable resistors for rotation in unison therewith, and a pair of variable resistors are coaxially mounted upon the opposing outer walls of the inner casing different from the opposing walls mounted upon the rotary shafts of the first pair of variable resistors in such a manner that the axes of the rotary shafts of the variable resistors mounted both on the outer and inner casings intersect with each other at right angles. A connecting member is coupled to the rotary shafts of the variable resistors mounted on the inner casing, and an operating shaft which may be rotated about its own axis extends from the connecting member at right angles to the axes of the rotary shafts of the variable resistors. The rotary shaft of one variable resistor or a ganged variable resistors is operatively coupled to the lower end of the operating shaft with or without a coupling member. When the operating shaft is tilted and rotated about its own axis, all of the variable resistors may be simultaneously controlled.

The above and other objects, features and advantages of the present invention will become more apparent from the following description of one preferred embodiment thereof taken in conjunction with the accompanying drawings.

BRIEF DESCRIPTION OF THE DRAWING

FIG. 3 is a sectional view taken along the line B—B of FIG. 1;

FIG. 4 is a sectional view, in an enlarged scale, illustrating the joint between the operating shaft and the rotary shaft of a ganged variable resistor; and FIG. 5 is a sectional view taken along the line C—C of FIG. 4.

DESCRIPTION OF THE PREFERRED EMBODIMENT

Figure 1:
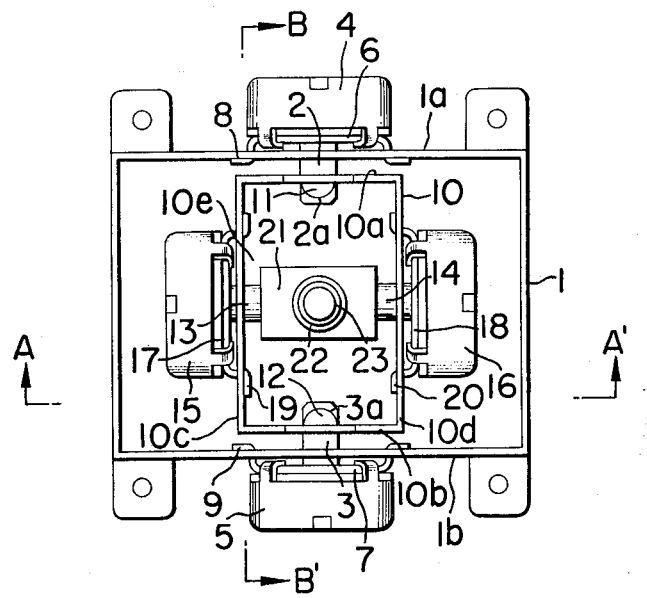
FIG. 1 is a top view of a variable resistor control device in accordance with the present invention.

An outer casing 1 is substantially square in cross section and has its both top and bottom members opened. Upon the outer walls 1a and 1b, in opposed relation of the outer casing 1, are coaxially mounted variable resistors 4 and 5 in such a manner that their rotary shafts 2 and 3 extend inwardly into the outer casing 1 through holes in the walls 1a and 1b. In the instant embodiment, the variable resistors are securely held in position on the walls 1a and 1b with ears 8 and 9 which are struck out of the shielding plates 6 and 7 of the variable resistors 4 and 5 being bent and pressed against the wall 1a and 1b after they are passed through holes therein. It should be noted that the rotary shafts 2 and 3 are aligned with each other.

An inner casing 10 which is rectangular in cross section and has its top opened is mounted on the rotary shafts 2 and 3 of the variable resistors 4 and 5. In the instant embodiment, the stepped or notched ends 2a and 3a of the rotary shafts 2 and 3 are inserted through holes in the opposing walls 10a and 10b and firmly engage with projections 11 and 12 struck out of the walls 10a and 10b under the spring action of the projections 11 and 12. Thus, the inner casing 10 may be rotated coaxially of and in unison with the rotary shafts 2 and 3 of the variable resistors 4 and 5.

Upon the other pair of opposing outer walls 10c and 10d are mounted variable resistors 15 and 16 in such a manner that their rotary shafts 13 and 14 extend into the inner casing 10. The variable resistors 15 and 16 are securely held in position on the walls 10c and 10d with ears 19 and 20 struck out of the shield plates 17 and 18 of the variable resistors 15 and 16 in a manner substantially similar to that described above in connection with the mounting of the variable resistors 4 and 5. The rotary shafts 13 and 14 are lined with each other and their extended axis intersect at right angles with that of the rotary shafts 2 and 3 of the variable resistors 4 and 5.

A connecting member 21 is mounted upon the rotary shafts 13 and 14 of the variable resistors 15 and 16 so that it may rotate in unison with the rotary shafts 13 and 14. An operating shaft 23 is rotatably supported by a bearing 22 which in turn is attached to a hole formed through the center of the top wall of the connecting member 21. A shaft 25 extending through a slot formed at the lower end of the operating shaft 23 is coupled to the latter with a pin 26 and is connected to a yoke member 32 which in turn is pivoted to a rotary shaft 31 for variable resistors 27–30 mounted upon the bottom 10e of the inner casing 10 downwardly thereof as best shown in FIGS. 4 and 5. Thus, when the operating shaft 23 is rotated, the rotary shaft 31 of the ganged variable resistors 27–30 is also rotated. From the foregoing description, it will be seen that the operating shaft 23 is coupled to the rotary shaft 31 through a universal joint and the crossing point between the shaft 25 and the pin 26 must coincide with that between the axes of the operating shaft 23 and the rotary shaft 31.

Figure 2:
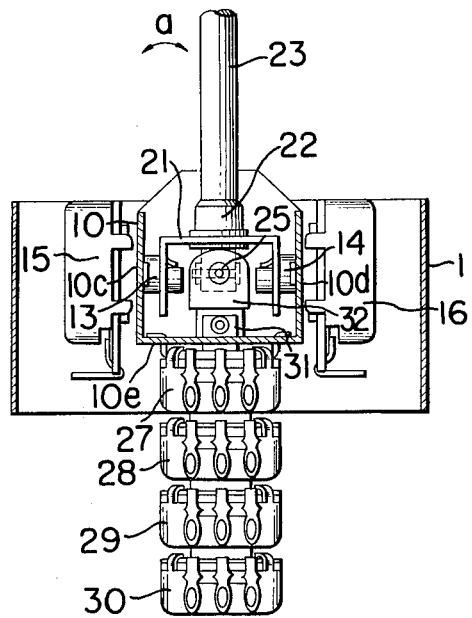
FIG. 2 is a sectional view taken along the line A—A of FIG. 1.

Next, the mode of operation will be described. When the operating shaft 23 is tilted in the direction indicated by the double-pointed arrow *a* from the position shown in FIG. 2, the inner casing 10 which is coupled through the connecting member 21 to the operating shaft 23 is rotated about the axis of the rotary shafts 2 and 3 of the variable resistors 4 and 5. Therefore, both of the variable resistors 4 and 5 are simultaneously adjusted. In this case, no torque is applied to the rotary shafts 12 and 13 of the variable resistors 15 and 16 so that their resistances remain unchanged.

When the operating shaft 23 is inclined in the direction indicated by the double-pointed arrow *b* from the position shown in FIG. 3, the rotary shafts 13 and 14 of the variable resistors 15 and 16 are rotated so that the variable resistors 15 and 16 may be simultaneously adjusted. In this case, no torque is applied to the rotary shafts 2 and 3 and the resistances of the variable resistors 4 and 5 remain unchanged.

After the variable resistors 4 and 5 have been adjusted in the manner described above, the operating shaft 23 may be tilted in the direction indicated by the arrow *b* so that the variable resistors 15 and 16 are simultaneously controlled in the manner described above without causing the change in the resistance of the variable resistors 4 and 5.

When the operating shaft 23 is tilted in the direction indicated by the arrow *a* after the variable resistors 15 and 16 have been adjusted in the manner described above by rotatng the operating shaft in the direction indicated by the arrow *b*, only the variable resistors 4 and 5 are simultaneously adjusted without causing the change in the resistance of the variable resistors 15 and 16. In summary, the variable resistors 4 and 5 may be simultaneously adjusted independently of the variable resistors 15 and 16 and vice versa, by rotating or tilting the operating shaft 23 in the direction indicated by the arrow *a* or *b*.

However, when the operating shaft 23 is tilted at, for example, 45° relative to the directions indicated by the arrows *a* and *b*, the rotary shafts 2, 3, 13 and 14 are rotated so that all of the variable resistors 4, 5, 15 and 16 are simultaneously adjusted.

When the operating shaft 23 is rotated about its own axis, the rotary shaft 31 of the ganged variable resistors 27–30 is rotated so that the variable resistors 27–30 may be adjusted without causing the change in resistance of the variable resistors 4 and 5 mounted on the outer casing 1 and the variable resistors 15 and 16 mounted on the inner casing 10. That is, when the operating shaft 23 is rotated, its rotation is transmitted through the universal joint consisting of the shaft 25, the pin 26 and the yoke member 32 to the rotary shaft 31. The control of the variable resistors 27–30 which are mounted upon the bottom of the inner casing 10 may be accomplished by rotating the operating shaft 23 about its own axis independently of the inclination thereof because the operating shaft 23 is coupled to the rotary shaft 31 through the universal joint as described above. When the operating shaft 23 is tilted in the direction indicated by the arrow *a*, it rotates about the shaft 25 but when the operating shaft 23 is tilted in the direction indicated by the arrow *b*, it rotates about the pin 26. Therefore, the variable resistors 27–30 may be adjusted simultaneously regardless of the position of the operating shaft 23.

In the instant embodiment, only one pair of variable resistors 4 and 5; and 15 and 16 are mounted on the outer and inner casings 1 and 10, respectively, but it will be understood that two- or three-ganged variable resistors may be mounted instead of the variable resistors 4, 5, 15 and 16. For example, a variable resistor may be mounted on the inner casing 10 in opposed relation with the variable resistor 4 or 5 and their rotary shafts may be drivingly coupled to each other. As the number of variable resistors mounted upon the bottom of the inner casing 10 is not limited, they may be directly mounted upon the operating shaft 23.

From the foregoing description, it is seen that one operating shaft may simultaneously control a plurality of volume controls in a stereophonic recording and reproducing system so that the balance among the sounds recorded or reproduced through a plurality of channels may be simultaneously attained. The simultaneous variable resistor control device, in accordance with the present invention, is especially advantageous when used in conjunction with a four-channel stereophonic recording and reproducing system. Furthermore, the control device of the present invention is simple in construction and can be made inexpensively.

What is claimed is:

1. A multiple-shaft simultaneous control device for controlling variable resistors comprising:

an outer frame having a first pair of opposed walls;

a first pair of variable resistors fixed to said first pair of opposed walls and having rotatable control shafts coaxially projecting inwardly through said opposed walls;

an inner frame fixed to the control shafts of said first pair of variable resistors and being provided with a second pair of opposed walls;

a second pair of variable resistors fixed to said second pair of opposed walls and having rotatable control shafts coaxially projecting inwardly through said second pair of opposed walls, the control shaft axes of said first and second pairs of variable resistors intersecting orthagonally;

a connecting member in said inner frame affixed to the control shafts of said second pair of variable resistors;

an operating shaft rotatably mounted on said connecting member, whereby rocking motion of said operating shaft selectively rotates the control shafts of either or both of said first and second pairs of variable resistors;

an additional variable resistor connected to the inner frame and having a control shaft projecting through said inner frame;

and a universal joint connecting the control shaft of the additional variable resistor to the operating shaft, said universal joint being located at the intersection of the control shaft axes of said first and second pairs of variable resistors.

* * * * *